United States Patent [19]
Mag et al.
[11] 4,240,972
[45] Dec. 23, 1980

[54] CONTINUOUS PROCESS FOR CONTACTING OF TRIGLYCERIDE OILS WITH AN ACID

[75] Inventors: Theodore K. Mag, King City; Margaret P. Reid, Don Mills, both of Canada

[73] Assignee: Canada Packers Limited, Toronto, Canada

[21] Appl. No.: 971,041

[22] Filed: Dec. 19, 1978

[51] Int. Cl.[3] ........................... C11B 3/04; C09F 5/02

[52] U.S. Cl. ................................... 260/424; 260/403; 260/412.3

[58] Field of Search ...................... 260/403, 412.3, 424

[56] References Cited

U.S. PATENT DOCUMENTS

| | | | |
|---|---|---|---|
| 2,686,794 | 8/1954 | Clayton | 260/403 |
| 2,783,260 | 2/1957 | Merker | 260/424 |
| 3,134,794 | 5/1964 | Myers | 260/403 |
| 3,704,006 | 11/1972 | Grout et al. | 210/63 R |
| 3,895,042 | 7/1975 | Taylor | 260/424 |

*Primary Examiner*—John F. Niebling

[57] ABSTRACT

A continuous process of contacting crude oils, particularly triglyceride oils, with an acid for the purpose of removing phosphatides and trace metals is disclosed. The acid is introduced into a stream of heated oil immediately ahead of mixing means, such as a static-mixer, capable of achieving an acid droplet size smaller than 10 microns in diameter. The interfacial surface provided by these microscopic droplets allows the acid-oil contacting process to occur essentially instantaneously, requiring less acid and less acid-oil residence-time. The process is useful in treating crude oils prior to alkali-refining or prior to a bleaching treatment in preparation for steam-refining.

9 Claims, No Drawings

CONTINUOUS PROCESS FOR CONTACTING OF TRIGLYCERIDE OILS WITH AN ACID

BACKGROUND OF THE INVENTION

1. Field of the Invention

The present invention relates to an improvement in a continuous process for removing phosphatides and trace metals from crude oil by contacting the oil with acid.

2. Description of the Prior Art

In the processing of oils and fats for purposes of producing salad and cooking oils, and other edible oil products such as margarines and shortenings, and in the processing of triglyceride oils generally, the crude oil is usually alkali-refined. Often, a pretreatment of the crude oil with an acid, such as phosphoric acid, is applied to the oil before alkali-refining. The purpose of this acid-pretreatment is to achieve a more thorough removal of phosphatides or mucilaginous material from the crude oil than could be achieved by treatment with alkali alone. In cases where the crude oil is to be physically refined, that is, free fatty acids are to be removed from the oil in a steam-distillation or steam-refining operation rather than by alkali-refining, acid-pretreatment is particularly important. In such cases it is the only means for rendering phosphatides insoluble in the oil and hence subject to removal in subsequent bleaching operations conducted prior to physical refining. Bleaching is typically conducted by contact of the oil with an adsorbent substance such as an adsorbent clay.

If phosphatides are not thoroughly removed from the oil to a level of below about 10 ppm as P prior to deodorizing for edible use, the desired oil quality in respect to color, flavor, and flavor-stability cannot be achieved in the products. In processing for industrial uses, such as for alkyd-resins or soap-making, removal of phosphatides and other mucilaginous material is particularly important to achieve proper color stability in the products made from the crude oils.

In addition to the removal of phosphatides the acid-pretreatment of crude oils also serves the purpose of removing traces of heavy metals, notably iron and copper. Relatively high concentrations of iron often occur because of the inevitable contact of oils with iron in the course of extraction, storage and transport. Copper is not usually a problem because it can be avoided as a material of construction in extraction, storage and transport equipment. Oils which usually have relatively high free fatty acid concentrations (above 2%) such as crude palm oil, or palm-kernel oil and coconut oil are particularly likely to have significant concentrations of iron. Values in the range of 5–15 ppm are quite common. Iron levels in this range are quite detrimental to the color and flavor stability of oils. Processing must be capable of removing the iron. Experience by many investigators has shown that it is desirable to reduce the concentration to 0.2 ppm or less to avoid significant pro-oxidative effects resulting in poor color and poor flavor-stability as discussed above.

Because of the relatively high free fatty acid content of the above-mentioned oils, processing economics favor the use of steam-refining in place of alkali-refining. A pretreatment with phosphoric acid followed by a treatment with bleaching clay is usually applied to achieve the required removal of iron and other impurities including small amounts of phosphatides present in these oils.

Treating crude oils with phosphoric acid, or other acids, can of course be expected to have effects on an oil in addition to those just described. For instance, chlorophyll and related compounds are usually removed more easily from an oil after a phosphoric acid treatment, although, it should also be mentioned that other, weaker acids such as citric and oxalic are not effective in this respect. Further, it may be expected that products of oxidative breakdown reactions present in an oil can be affected by the acid-treatment. However, most of these effects are difficult to measure by analytical tests. It is, therefore, preferred when evaluating the total effect of the acid-treatment on an oil to process it to the end product, that is, through the alkali-refining, bleaching, and deodorizing operations, or, through bleaching and steam-refining/deodorizing, after the acid treatment. In the case of edible oils, evaluating the quality of the deodorized oil ensures that all effects, including those which cannot be determined analytically are measured.

In the pretreatment of crude oils with phosphoric acid as carried out in the industry, the acid is mixed with the oil or liquified fat (hereinafter designated generically as oil) at the desired contacting temperature and the mixture is held at that temperature for a sufficient amount of time to accomplish the desired reaction with phosphatides, heavy metals and other materials. The acid-pretreatment oil is then either immediately alkali-refined, or, if steam-refining/deodorizing of the oil is intended, is immediately treated with bleaching-clay. The removal of the acid-precipitate or acid-reacted material occurs together with the soapstock when the oil is subsequently alkali-refined, or with the spent bleaching-earth during filtration, when the acid-treated oil is treated with bleaching clay. It could, of course, also be removed centrifugally before alkali-refining or bleaching.

The acid contacting process is usually carried out in an agitated vessel, either batchwise, semi-continuously, or continuously. In the latter case, a compartmented and baffled vessel or reactor is usually used with an agitator in each compartment. The vessel is sized for an "average" residence-time similar to the "actual" residence-time required in a batch or semi-continuous operation. In most processing plants the continuous mode of operation is preferred because it is better suited for operation together with an alkali-refining or bleaching process, which are usually continuous operations.

The length of time required for the maximum effect of acid-oil contact is usually in the order of 15–30 minutes in batch, semi-continuous or continuous contacting apparatus. This contact-time, or residence-time, is required, at least in part, because of the insolubility of the acid in the oil. Another reason for the relatively long contact-times is that due to economic considerations, the amount of acid used must be as low as possible, yet accomplish removal of substantially all the phosphatides and metals. Moreover, in continuous operations, there is the added difficulty of short-circuiting and back-mixing of oil passing through the mixing vessel which often requires sizing of the vessel to allow an average residence-time greater than the residence-time required for a batch operation.

The limitations of conventional contacting equipment with respect to the degree of mixing which can be achieved and the relatively long contact-times required, present several disadvantages. Firstly, because of the long contact-times it is necessary to operate under vacuum or an inert gas, or to keep the reaction vessel flooded to ensure exclusion of air during the process to avoid oxidative damage to the oil. Secondly, changing the oil-stock to be processed is relatively cumbersome and results in a significant loss in processing capacity if done frequently. Thirdly, there are also general disadvantages stemming from building space, equipment costs, and acid usage. The object of the present process is to overcome these disadvantages.

SUMMARY OF THE INVENTION

It has been found that in a process for continuous contacting of crude oils with an acid, such as, phosphoric acid, or an aqueous solution of adequate strength of such an acid, very intensive mixing for a time which is in the order of a fraction of a second, such that the acid is dispersed throughout the oil in the form of droplets smaller than about 10 microns in diameter, eliminates the need for any substantial contact time to facilitate subsequent removal of phosphatides and trace metals from these oils. Also, a saving in acid usage is realized compared to conventional processes.

In the process, the oil is first heated to contacting temperature and then continuously pumped through mixing means. The acid or acid solution is continuously introduced into the oil immediately ahdead of the mixing means. In the mixing means, the acid or acid solution is dispersed in the oil in droplets generally smaller than about 10 microns in diameter. The interfacial area provided by these microscopic droplets allows the acid-oil contacting process for conditioning of phosphatides and trace metals to be extremely efficient in respect to the time and the amount of acid required. The process of the invention is particularly effective for removing phosphatides and trace metals from triglyceride oils.

DETAILED DESCRIPTION OF THE INVENTION

The crude oil is heated in a heat exchanger to acid-contacting temperature. This temperature may vary somewhat depending on the composition of the oil, but generally due to the increase in oil viscosity at low temperatures it is not advisable to use temperatures below about 70° C. (160° F.). Also, due to the danger of heat damage to the phosphatides and other heat-labile compounds in the crude oil it is advisable not to exceed about 120° C. (250° F.). The preferred temperature range is from about 95° C. to 105° C. (205° F.-220° F.). The acid, or acid solution is continuously introduced immediately ahead of the mixing means.

The mixing means for use in the process of the present invention is a high intensity mixing device, such as a static-mixer. Such mixers are commercially available under the trade-names Kenics Static Mixer, Komax Motionless Mixer, Series 50 In-Line Blender by Lightnin, Ross Motionless Mixers and Sulzer Static Mixer. These devices are tubular structures having fixed, mixing elements inside, which accomplish flow division and radial mixing, simultaneously.

The static-mixer is sized to give a flow velocity of about 3.0 m/sec.-7.6 m/sec. (10 ft/sec.-25 ft/sec.). In this flow-velocity range, depending somewhat on oil temperature and the number and shape of the mixing elements in the mixer, the acid is dispersed throughout the oil in microscopic droplets smaller than 10 microns in size. The preferred static-mixer is the Kenics Static Mixer, which contains helical mixing elements approximately 1.5 pipe diameters in length. The construction and operation of this device is described in U.S. Pat. Nos. 3,286,992, 3,664,638 and 3,704,006. A mixer assembly containing about 12 mixing elements gives the desired performance. Static mixers (also known as motionless mixers) of a variety of designs, as well as other, motor-driven mixers may also be used in the process of the present invention provided that the 10 micron droplet size can be achieved. Upon exiting the mixer the acid-oil mixture may be allowed additional residence-time in piping or vessels provided for that purpose before alkali-refining or contacting with bleaching adsorbent, or it may be directly and immediately alkali-refined or contacted with bleaching adsorbent thereby providing an acid-oil residence-time which is effectively zero. Any alkali-refining or bleaching process may be used for this purpose. The acid-oil mixture may also be centrifuged or filtered for purposes of removing oil-insoluble material prior to alkali-refining or adsorbent contacting.

The process of the present invention thus provides an acid-pretreatment for crude oils, particularly crude triglyceride oils, which effectively removes phosphatides and trace metals without the need for large quantities of acid or lengthy acid-oil residence-times. In general, residence-times of about one minute or less are required. However, as shown by the Examples which follow, in many cases no residence-time whatsoever is required. This surprising decrease in, and possible elimination of, residence-time results directly from the fact that the acid or acid solution is dispersed in the oil in droplets smaller than 10 microns in diameter by action of the static mixer. The interfacial area provided by these microscopic droplets increases the efficiency of the acid in removing phosphatides and trace metals from the oil.

To further illustrate various aspects of the present invention, the following Examples are provided. However, it is understood that their purpose is entirely illustrative and in no way intended to limit the scope of the invention.

EXAMPLE 1

Crude rapeseed oil with a phosphatide content of 221 ppm as P was contacted with 85% concentrated phosphoric acid at a rate of 190 kg/hr. (420 lbs/hr.) using 0.15% and 0.30% of the acid according to the invention. The oil was first heated to 105° C. (220° F.) by passing it through a heat exchanger. The heated oil was then directly pumped through a Kenics Static Mixer containing 17 helical elements and giving a flow-velocity of 6.0 m/sec. (19.8 ft/sec.). The acid was introduced into the oil immediately ahead of the first helical element by a metering pump. The acid-oil dispersion was then passed through a pipe loop to provide a residence-time of 1 minute before alkali-refining.

Alkali-refining was done in the laboratory, batchwise, under standard conditions as usually practiced in the industry.

For comparison, the same crude oil was also contacted with 0.2% and 0.4% of the acid in a continuous flow-through stirred reactor equipped with 4 turbine agitators in 4 baffled compartments. The stirring speed was 210 rpm. The contact temperature was 105° C. (220° F.) and the average residence-time of the acid/oil mixture was 30 minutes before alkali-refining as described above.

A further comparison was made by contacting the same crude oil with 0.2% and 0.4% of the acid batch-wise in the laboratory for 30 minutes at 105° C. (220° F.) at vigorous agitation with a paddle agitator before alkali-refining.

Finally, the same crude oil was alkali-refined without any prior acid treatment. The alkali-refined oils were evaluated with respect to phosphorus content and free fatty acids and then bleached with 1.5% of an activated bleaching clay (Filtrol 105) before deodorizing. The deodorized oils were evaluated for color, flavor, and Schaal-oven stability. The results of these test-runs are given in Table I.

The data show that with this oil 0.15% phosphoric acid was not adequate to achieve the removal of phosphatides to levels below 10 ppm as P. However, the process of the invention achieved significantly better removal, down to 15 ppm as P, with 25% less acid than did the two conventional methods which gave 50 ppm. Deodorized oil quality, particularly in respect to Schaal-oven stability was best with the oil processed by the method of the present invention, but not quite adequate. When the use of phosphoric acid was increased to 0.3% (0.4% with the stirred reactor and lab-batch process) excellent results were achieved in respect to removal of phosphatides and deodorized oil quality, except with the lab-batch method. Alkali-refining alone again gave very poor removal of phosphatides and poor deodorized-oil quality.

TABLE I

PHOSPHORIC ACID PRETREATING OF *CRUDE RAPESEED OIL

| | Acid Treatment | | | Alkali-Ref. Oil | | Deodorized Oil | | |
|---|---|---|---|---|---|---|---|---|
| | $H_3PO_4$ % | Mixer Flow-Vel. m/sec | Resid. Time Min. | FFA % | P PPM | Color R (5¼") | Flavor 10→1 | Schaal Stability Days |
| Static Mixer | 0.15 | 6.0 | 1 | 0.07 | <2 | 0.3 | 6 | 9 |
| Stirred Reactor | 0.20 | — | 30 | 0.09 | 8 | 0.3 | 7 | 10 |
| Lab-Batch | 0.20 | — | 30 | 0.06 | 26 | 0.3 | 7 | 5 |
| Static Mixer | 0.30 | 6.0 | 1 | 0.06 | 3 | 0.3 | 7 | 10 |
| Stirred Reactor | 0.40 | — | 30 | 0.07 | 5 | 0.3 | 7 | 13 |
| Lab-Batch | 0.40 | — | 30 | 0.09 | 7 | 0.3 | 7 | 11 |
| Alk. Ref. Only | — | — | — | 0.16 | 156 | 0.9 | 1 | 0 |

*Phosphatides Content Of Crude Oil (As P) = 221 ppm.

The above data show that the acid-oil contacting process of the present invention results in the lowest phosphorus concentrations after alkali-refining in spite of a 25% lower acid usage. Deodorized oil quality is equal to or better than that with the other, more conventional acid-oil contacting methods. It should also be noted that alkali-refining alone was quite inadequate for thorough removal of phosphatides and for achieving the necessary oil quality after deodorizing.

EXAMPLE 2

A crude rapeseed oil with a phosphatide content of 301 ppm as P was contacted with 85% concentrated phosphoric acid at a rate of 190 kg/hr (420 lbs/hr) using 0.15% and 0.30% of the acid under substantially the same conditions as described in Example 1. The same comparisons were made as described in Example 1. The results of these tests are given in Table II.

EXAMPLE 3

Crude soybean oil with a phosphatide content of 237 ppm as P was processed according to the invention. The processing rate was 190 kg/hr (420 lbs/hr) using 0.16% of 85% concentrated phosphoric acid. Two different static-mixer flow-velocities were used, 2.8 m/sec (9.2 ft/sec) and 3.3 m/sec (10.7 ft/sec). Also, with each acid-oil dispersion achieved at the two flow-velocities a residence-time of either 1 minute or no residence-time was allowed. Otherwise, substantially the same processing conditions as outlined in Example 1 were used except for the use of 0.5% bleaching clay, and the same comparisons with the more convention methods were made. The results of these tests are given in Table III.

TABLE II

PHOSPHORIC ACID PRETREATING OF *CRUDE RAPESEED OIL

| | Acid Treatment | | | Alkali-Ref. Oil | | Deodorized Oil | | |
|---|---|---|---|---|---|---|---|---|
| | $H_3PO_4$ % | Mixer Flow-Vel. m/sec | Resid. Time Min. | FFA % | P PPM | Color R (5¼") | Flavor 10→1 | Schaal Stability Days |
| Static Mixer | 0.15 | 6.0 | 1 | 0.09 | 15 | 0.6 | 8 | 5 |
| Stirred Reactor | 0.20 | — | 30 | 0.08 | 50 | 0.6 | 7 | 4 |
| Lab-Batch | 0.20 | — | 30 | 0.09 | 50 | 0.8 | 3 | 0 |
| Static Mixer | 0.30 | 6.0 | 1 | 0.06 | 5 | 0.3 | 8 | 10 |
| Stirred Reactor | 0.40 | — | 30 | 0.06 | 7 | 0.3 | 8 | 10 |
| Lab-Batch | 0.40 | — | 30 | 0.05 | 16 | 0.4 | 7 | 5 |
| Alk. Ref. Only | — | — | — | — | 154 | 1.7 | 1 | 0 |

*Phosphatides Content Of Crude Oil (As P) 301 PPM.

TABLE III

PHOSPHORIC ACID PRETREATING OF *CRUDE SOYBEAN OIL

| | Acid Treatment | | | Alkali-Ref. Oil | | Deodorized Oil | | |
|---|---|---|---|---|---|---|---|---|
| | $H_3PO_4$ % | Mixer Flow-Vel. m/sec | Resid. Time Min. | FFA % | P PPM | Color R (5¼") | Flavor 10→1 | Schaal Stability Days |
| Static Mixer | 0.16 | 2.8 | 1 | 0.06 | 12 | 1.0 | 5 | 2 |

TABLE III-continued

| PHOSPHORIC ACID PRETREATING OF *CRUDE SOYBEAN OIL | | | | | | | | |
|---|---|---|---|---|---|---|---|---|
| | Acid Treatment | | | Alkali-Ref. | | Deodorized Oil | | |
| | | Mixer | Resid. | Oil | | Color | | Schaal |
| | $H_3PO_4$ % | Flow-Vel. m/sec | Time Min. | FFA % | P PPM | R (5¼") | Flavor 10→1 | Stability Days |
| Static Mixer | 0.16 | 2.8 | None | 0.07 | 9 | 0.8 | 7 | 2 |
| Static Mixer | 0.16 | 3.3 | 1 | 0.03 | 2 | 0.5 | 8 | 10 |
| Static Mixer | 0.16 | 3.3 | None | 0.04 | 2 | 0.5 | 7 | 8 |
| Stirred Reactor | 0.10 | — | 30 | 0.03 | 20 | 0.6 | 7 | 10 |
| Stirred Reactor | 0.20 | — | 30 | 0.04 | 12 | 0.4 | 7 | 10 |
| Lab-Batch | 0.10 | — | 30 | — | 25 | 0.7 | 7 | 3 |
| Lab-Batch | 0.20 | — | 30 | 0.04 | 7 | 0.5 | 6 | 8 |
| Alk. Ref. Only | — | — | — | 0.04 | 55 | 2.0 | 3 | 0 |

*Concentration Of Phosphatides In Crude Oil (As P) 237 PPM.

At the flow-velocity of 2.8 m/sec phosphatide removal was barely adequate with the process of the present invention and flavor stability was poor. At 3.3 m/sec very good results were achieved with respect to phosphatide removal and deodorized oil quality. Allowing a residence-time of 1 minute or refining immediately did not result in significant differences in phosphatide removal or deodorized oil quality. Adequate results with the conventional processes were only achieved when using 0.2% acid instead of 0.16%, or 25% more than in the process of the present invention. Alkali-refining alone gave unacceptable results.

EXAMPLE 4

Crude palm oil with an iron content of 15.4 ppm was acid-preteated according to the invention. The processing rate was 190 kg/hr (420 lbs/hr) using 0.10% of the 85% concentrated phosphoric acid. The static-mixer contained 12 mixing elements and the flow-velocity was 6.0 m/sec (19.8 ft/sec). After producing the acid-oil dispersion a residence-time of 1 minute was allowed. The acid-oil mixture was then immediately contacted with 1.6% bleaching-clay in a continuous process to remove any oil-insoluble impurities and to bleach the oil.

Bleaching temperature was 105° C. (220° F.). The bleached oil was then filtered to remove the bleaching clay. The filtered oil was steam-refined/deodorized in the laboratory. For comparison the oil was also acid-contacted in the stirred reactor and batchwise in the laboratory as described in Example 1.

After acid-treating in the stirred reactor, the oil was immediately bleached in the same equipment and under the same conditions as used with the oil from the process of the present invention. After batch-acid contacting, bleaching was also done batchwise, under vacuum in the laboratory. Table IV gives the results of these tests.

TABLE IV

| PHOSPHORIC ACID PRETREATING OF *CRUDE PALM OIL | | | | | | |
|---|---|---|---|---|---|---|
| | Acid Treatment | | | | steam-Refined/ | |
| | | Mixer | | Bleached | Deodorized Oil | |
| | $H_3PO_4$ % | Flow-Vel. m/sec | Resid. Time Min. | Oil Fe PPM | Color R (5¼") | Flavor 10→1 |
| Static Mixer | 0.10 | 6.0 | 1 | 0.12 | 2.5 | 8 |
| Stirred Reactor | 0.14 | — | 30 | 0.21 | 2.4 | 8 |
| Lab- | 0.14 | — | 30 | 0.17 | 2.2 | 8 |
| Batch Bleached Only | — | — | — | 1.55 | 2.9 | 5 |

*Fe-Concentration In The Crude Oil 15.4 PPM.

The data show that the static-mixer process results in very efficient removal of iron and also results in acceptable color and flavor after steam-refining/deodorizing. The other two methods also achieved acceptable iron removal and deodorized-oil quality but used 25% more acid. Bleaching alone did not achieve adequate removal of iron and resulted in oil of significantly poorer color and flavor.

EXAMPLE 5

Crude soybean oil with a phosphatide content of 185 ppm as P was acid-pretreated according to the present invention. The processing rate was 190 kg/hr (420 lbs/hr) using 0.30% and 0.20% of 85% concentrated phosphoric acid. The static-mixer contained 12 mixing elements. Two flow-velocities were used, 7.0 m/sec (23.1 ft/sec) and 3.3 m/sec (10.7 ft/sec). Also, in one test at the higher flow-velocity, no residence-time was allowed. The pretreated oils were immediately bleached with 3.5% or 2.5% clay in a continuous process at a temperature of 170° C. (340° F.) to remove precipitated and colored material from the oil. The oil was then cooled to 100° C. (210° F.) and filtered to remove the bleaching clay. The filtered oils after this acid and clay pretreatment were analyzed for phosphorus and then steam-refined/deodorized in the laboratory under standard conditions. For ciomparison, the acid-treatment was also done in the stirred reactor as described in Example 1 using 0.30% acid, and batchwise in the laboratory using 0.30% and 0.20% acid. In both cases the oils were bleached with 3.5% or 2.5% bleaching clay immediately after the acid contacting process at 170° C. (240° F.). After acid-treating in the stirred reactor, the same bleaching process was used as with the acid-treating process of the present invention. In the case of lab-batch acid-treating, the oil was bleached batchwise under vacuum. The results of these tests are given in Table V.

TABLE V

PHOSPHORIC ACID PRETREATING OF *CRUDE SOYBEAN OIL

| | Acid Treatment | | | Bleached Oil | | Steam-Refined/Deodorized Oil | | |
|---|---|---|---|---|---|---|---|---|
| | $H_3PO_4$ % | Mixer Flow-Vel. m/sec | Resid. Time Min. | Clay % | P PPM | Color R (5¼") | Flavor 10→1 | Schaal Stability Days |
| Static Mixer | 0.30 | 7.0 | 1 | 3.5 | 6 | 0.3 | 8 | 10 |
| Static Mixer | 0.30 | 7.0 | None | 3.5 | 6 | 0.3 | 8 | 10 |
| Static Mixer | 0.20 | 7.0 | 1 | 2.5 | 9 | 0.4 | 8 | 9-10 |
| Static Mixer | 0.30 | 3.3 | 1 | 3.5 | 7 | 0.3 | 8 | 8-9 |
| Stirred Reactor | 0.30 | — | 30 | 3.5 | 16 | 0.3 | 8 | 8-9 |
| Lab-Batch | 0.30 | — | 30 | 3.5 | 14 | 0.3 | 9 | 9 |
| Lab-Batch | 0.20 | — | 30 | 2.5 | 42 | 0.6 | 8 | 6 |

*Concentration Of Phosphatides In Crude Oil (As P) 185 PPM.

The data show that the best results were obtained with the static-mixer method of acid-oil contacting. With 0.30% acid, P-levels after bleaching were down to 6, 6 and 7 ppm using a flow-velocity of 7.0 m/sec (23.1 ft/sec) or 3.3 m/sec (10.7 ft/sec) respectively. When 0.20% acid was used (at 7.0 m/sec) results were still acceptable at 9 ppm of P. Allowing a residence time of 1 minute, or none at all did not make any difference. Deodorized oil quality in terms of color, flavor, and flavor stability was very good with these oils.

When the stirred reactor was used with 0.30% acid phosphatides in the bleached oil were higher at 16 ppm as P. Oil quality after deodorizing was still very good. In the batch operation essentially the same result was achieved except when using only 0.20% acid in which case 42 ppm as P was left in the bleached oil and deodorized oil color and stability were significantly poorer than in the other oils.

While the invention has now been described in terms of certain preferred embodiments, those of skill in the art will readily appreciate that various modifications, omissions, substitutions, and changes may be made without departing from the spirit thereof. It is, therefore, intended that the scope of the invention be limited solely by the scope of the following claims.

What is claimed is:

1. In a continuous process of contacting crude triglyceride oils with an acid to remove phosphatides and heavy metals, the improvement comprising:

continuously introducing the acid into a stream of heated oil and immediately subjecting the resulting mixture to intensive mixing action such that the acid is dispersed throughout the oil in the form of droplets smaller than about 10 microns in diameter and the phosphatides are substantially instantaneously reacted with the acid.

2. The process as defined by claim 1, wherein said acid-treated oil is subsequently subjected to alkali-refining.

3. The process as defined by claim 1, wherein said acid-treated oil is subsequently subjected to bleaching and steam-refining.

4. The process as defined by claims 1, 2 or 3, wherein the residence-time for the acid-oil contact is approximately one minute or less.

5. The process as defined by claims 1, 2 or 3, wherein the oil is heated to a temperature between about 70° and 120° C. prior to introduction of the acid.

6. The process as defined by claim 5, wherein the oil is heated to a temperature between about 95° and 105° C. prior to introduction of the acid.

7. The process as defined by claims 1, 2 or 3, wherein the acid is concentrated phosphoric acid.

8. The process as defined by claim 1, wherein said triglyceride oils comprise oils selected from the group consisting of crude rapeseed oil, crude soybean oil, crude palm oil and mixtures thereof.

9. The process as defined by claims 1, 2 or 3, wherein said intensive mixing action is provided by a static mixer.

* * * * *